US011274030B2

(12) United States Patent
Driessen et al.

(10) Patent No.: US 11,274,030 B2
(45) Date of Patent: Mar. 15, 2022

(54) TESTING COLORANT CONDITION

(71) Applicant: Fast & Fluid Management B.V., Sassenheim (NL)

(72) Inventors: Martinus E. J. L. Driessen, Oegstgeest (NL); Ronald P. Krom, Katwijk (NL); Mark Baak, Lisse (NL); Bob Leonard Honsbeek, Voorhout (NL)

(73) Assignee: Fast & Fluid Management B.V., Sassenheim (NL)

( * ) Notice: Subject to any disclaimer, the term of this patent is extended or adjusted under 35 U.S.C. 154(b) by 184 days.

(21) Appl. No.: 16/820,818

(22) Filed: Mar. 17, 2020

(65) Prior Publication Data

US 2020/0299124 A1 Sep. 24, 2020

(30) Foreign Application Priority Data

Mar. 19, 2019 (EP) .................................... 19163851

(51) Int. Cl.
*G01N 7/00* (2006.01)
*B67D 7/02* (2010.01)
*B67D 7/32* (2010.01)

(52) U.S. Cl.
CPC ............. *B67D 7/3281* (2013.01); *B67D 7/02* (2013.01)

(58) Field of Classification Search
CPC .... B67D 7/3281; B67D 7/02; B05B 15/0275; B01F 13/1058; B01F 15/00246; B01F 15/0283; B01F 15/0292; B01F 15/00051; B01F 2215/005; G01N 2291/02872; G01N 7/00
USPC ........................................... 222/63; 73/19.01
See application file for complete search history.

(56) References Cited

U.S. PATENT DOCUMENTS 3,677,540 A * 7/1972 Weiss ..................... A01C 15/00 222/23
4,850,805 A * 7/1989 Madsen ................ A61M 5/172 417/18
4,946,100 A * 8/1990 Flemming ........... B01F 13/1055 239/1
5,078,302 A * 1/1992 Hellenberg ......... B01F 13/1058 141/104
8,029,247 B2 * 10/2011 Cedrone ............... F04B 49/065 417/274
8,083,498 B2 * 12/2011 Gonnella ................ F04B 17/03 417/274
8,292,598 B2 * 10/2012 Laverdiere ............ F04B 49/065 417/274

(Continued)

FOREIGN PATENT DOCUMENTS

WO 2016042104 A1 3/2016

OTHER PUBLICATIONS

EP Search Report for priority European Patent Application No. 19163851.9, dated Sep. 5, 2019, 7 pages.

*Primary Examiner* — Paul R Durand
*Assistant Examiner* — Michael J. Melaragno
(74) *Attorney, Agent, or Firm* — Tucker Ellis, LLP; Heather M. Barnes; Michael G. Craig

(57) ABSTRACT

Liquid dispenser and method for operating such a liquid dispenser, such as a dispenser for tinting pastes. The dispenser comprises at least one liquid container and at least one reciprocating pump. First, a suction stroke is carried out at a set pump speed. After the suction stroke, the pump is closed off. Then, a pressure stroke is started while the pump is closed.

20 Claims, 4 Drawing Sheets

(56) References Cited

U.S. PATENT DOCUMENTS

| | | | | |
|---|---|---|---|---|
| 9,010,367 | B2 * | 4/2015 | McCormick | G05D 11/005 137/565.29 |
| 9,359,184 | B2 * | 6/2016 | Post | B67D 7/3245 |
| 9,494,240 | B2 * | 11/2016 | Voskuil | F16K 1/34 |
| 2008/0115662 | A1 | 5/2008 | Yajima | |
| 2012/0175383 | A1 * | 7/2012 | Engels | B01F 7/00633 222/135 |
| 2012/0248137 | A1 * | 10/2012 | Baak | F16K 11/074 222/1 |
| 2012/0248147 | A1 * | 10/2012 | Krom | B01F 13/1058 222/135 |
| 2012/0250451 | A1 * | 10/2012 | Post | B01F 15/00831 366/137 |
| 2012/0302945 | A1 | 11/2012 | Hedmann et al. | |
| 2014/0271231 | A1 * | 9/2014 | Post | B01F 15/0283 417/44.1 |
| 2016/0047371 | A1 | 2/2016 | Post | |
| 2017/0252766 | A1 | 9/2017 | Post et al. | |
| 2017/0326517 | A1 * | 11/2017 | Drocco | B05B 15/50 |
| 2017/0350377 | A1 * | 12/2017 | Huang | F04B 23/02 |
| 2018/0126346 | A1 * | 5/2018 | Post | B01F 13/1058 |
| 2018/0312389 | A1 * | 11/2018 | Post | A61L 2/20 |

* cited by examiner

TESTING COLORANT CONDITION

CROSS-REFERENCE TO RELATED APPLICATIONS

This application claims priority to European Patent Application No 19163851.9, filed Mar. 19, 2019, of which is incorporated herein by reference.

BACKGROUND

The present disclosure relates to a method for operating a liquid dispenser comprising at least one liquid container and at least one positive displacement pump, in particular for dispensing a non-Newtonian liquid such as a tinting paste or paint colorant. The invention also relates to a dispenser configured to facilitate such a method.

Tinting pastes, also called colorants or pigment pastes, are concentrates of organic and/or inorganic pigments used for tinting base paints, for instance at a point of sale or a car refinish body shop. The dispensers typically comprise one or more canisters or containers on a rotatable turntable or other type of platform. The container may comprise a pump or can selectively be connected to a pump to dispense a selected amount of the tinting paste. The tinting pastes can be water borne or they can be solvent borne.

Different tinting pastes have different rheological profiles. Tinting pastes are typically non-Newtonian showing a shear dependent viscosity. The rheological behaviour is also dependent on the temperature. Moreover, viscosity may increase over time due to settlement of pigment particles and evaporation of water.

The dispenser is usually programmed to pump a tinting paste from the associated container to the dispense nozzle using set pumping speeds. If the rheological profile of a tinting paste results in high flow resistance, the tinting paste may be too viscous and slow to follow the pace of the pump, resulting in vacuum voids in the pump chamber. As a consequence, the pumped amount of tinting paste is less than intended, resulting in an aberrant colour of the final tinted paint.

The pumped amount of tinting pastes can also contain air, for instance air entrapped during production or mixing, or air entered into the tinting paste flow via a leaking seal or the like, or the pump may not be properly de-aired before use.

US 2016/0047371 discloses a dispenser generating a parameter indicative of the rheological quality of a tinting paste during a displacement stroke of a piston pump.

WO 2016/042104 discloses a dispenser for tinting pastes establishing the degree of compressibility or expandability of the tinting pastes or the encountered flow resistance. The degree of compressibility is an indication for the presence of entrapped air, whereas flow resistance is indicative for the condition of the tinting paste.

Notwithstanding the good results achieved with these prior art systems, there is still a need for further reducing the risk of aberrant tinting.

SUMMARY

A method is disclosed for operating a liquid dispenser comprising at least one liquid container and at least one reciprocating pump, such as a piston pump or a bellows pump. The pump is configured to withdraw liquid from the container during a suction stroke. The method comprises the following steps:

a suction stroke is carried out at a set pump speed;

after the suction stroke, the pump is closed off;

a pressure stroke is started while the pump is closed off.

If the pressure stroke is blocked almost immediately, the piston or bellows of the pump will not move down or move down along a distance not exceeding a set value. This means that the pumped content is not compressible, so it does not contain a void. However, if the piston or bellows moves down over a distance exceeding the set value, then such a void must be present.

A detected void can be a vacuum void or an air void, or a combination thereof. If the void is a vacuum void, it will not appear again if the steps are repeated with a slower speed during the suction stroke or with a waiting time at the end of the suction stroke. Accordingly, in order to examine whether the detected void is a vacuum void or an air void, the following additional steps can be carried out:

the pump is emptied;

an extended second suction stroke is carried out. The stroke can for example be extended by using a lower pump speed and/or by adding a waiting time at the end of the suction stroke;

after the second suction stroke and the optional waiting time the pump is closed off;

a pressure stroke is started while the pump is closed off.

If this second pressure stroke is almost immediately blocked, the void detected after the first run, must have been a vacuum void.

Compared to the first suction stroke, the second suction stroke can for example be extended with a time period of at most 10 sec, e.g., about 1-6 second, e.g., about 1-3 seconds.

If the void is a vacuum void, the set pump speed for dispensing may be reduced for the specific liquid, so as to avoid vacuum voids during dispensing. Alternatively, or additionally, a warning signal can be issued to an operator, who may for example replace the liquid by a fresh amount or add water, solvent or rheological agents to lower the viscosity.

If, after this second run, the piston or bellows still moves down over a distance exceeding a set value, then a void must again be present. This is an indication that the void contains air. To examine this, the pressure stroke by the piston may be continued while the valve is still closed until the resistance exceeds an upper limit. Since liquids as such are not compressible, compressibility of the content in the pump chamber is indicative for the presence of air. The amount of air in the closed pump chamber can straightforwardly be calculated from the length of the partial pressure stroke. Since the pressure stroke is carried out while the valve is closed, it is preferred to run the motor with a lower power, e.g., with about 20% of the normal power consumption, e.g. using a pressure of at most 3 bar. This helps to reduce the influence of the flexibility of the construction on the outcome of the tests and helps to prevent damage.

Some types of liquid may contain entrapped air, e.g., as a result of mixing, stirring or the applied production process. In that case the ratio of air relative to liquid in the pump chamber will be independent from the pump stroke. It is also possible that air is enclosed above the liquid level, for instance resulting from a leaking seal in the dispense system. In that case the amount of air will be the same regardless whether the pump stroke is partial or full.

To examine whether the enclosed air is entrapped in the liquid or above liquid level, the test can be continued by:

opening and emptying the pump;

subsequently making a new, partial suction stroke;

closing off the pump;

starting and continuing a pressure stroke until the resistance again exceeds an upper limit and calculating the amount of air in the piston chamber after the partial suction stroke. If the calculated amount of air after the partial second suction stroke is the same as the amount calculated after the first suction stroke, then the air must come from a leaking seal, or insufficient venting of the pump, or the like. The control unit may then send a warning signal to an operator who may take appropriate measures. If the calculated amount of air is found to be proportional to the stroke volume, then the air must be entrapped in the liquid mixture. In that case, the metering of the dispensed amounts may be adjusted to compensate for the entrapped air content. Additionally, or alternatively, it may be tried to lower the air content by changing stirring parameters, and/or by exposing the liquid to a vacuum, and/or by adding defoaming agents to the liquid and/or reducing the viscosity, e.g., by adding water and/or thinners, and/or by adjusting a dispense protocol, e.g., by applying an additional prime stroke.

The pressure stroke is carried out when the pump is closed off, so any dispense flow is blocked, just as any return flow to the container. The pressure stroke can be carried out with reduced pump power.

The method may for example be carried out with a liquid dispenser comprising:

at least one container; and at least one reciprocating pump, such as a bellows pump or a piston pump comprising a pump chamber and a piston reciprocating within the pump chamber, the pump being connected or connectable to the container;

a control unit for controlling the pump. The control unit is programmed to run a test at a selected moment, the test involving closing off the pump chamber after a suction stroke by the pump and subsequent starting a pressure stroke by the pump, as set out above.

The tests can for example be run fully automatically, for instance at night or at other moments not hindering normal use.

The dispenser may for example comprise an electric motor driving the pump, such as a stepper motor.

In a specific implementation, and the electric motor may comprise at least one sensor operatively coupled with the rotor, the sensor may comprise a home sensor, position sensor and/or an encoder. Using a stepper motor, the encoder counts the steps made by the stepper motor. In such an implementation, the control unit can be configured to receive and process the number steps counted by the encoder during an attempted pressure stroke. If the pressure stroke is almost immediately blocked, the number of steps counted by the encoder will not exceed a set limit. This means that there is no vacuum or air void in the pumped content.

Optionally, the programmed test may include proceeding with the pressure stroke until the encountered resistance exceeds a limit value, e.g., until stalling of the electric motor. Air enclosures will be compressed. As set out above, compressibility of the pump chamber content is indicative for the presence of enclosed or entrapped air. If an encoder is used, the number steps counted by the encoder during the suction stroke is indicative for the presence of air in the pump chamber.

Optionally, the control unit is programmed to repeat these steps applying a partial suction stroke and compare the calculated compressibility with the compressibility calculated with the complete suction stroke. The compressibility is calculated as the ratio of the piston's travel length during the pressure stroke and the piston travel length during the suction stroke. If the compressibility is the same, then the air is homogenously entrapped as bubbles in the tinting paste. However, if the length of the pressure stroke after the first suction stroke is the same as the length of the pressure stroke after the partial suction stroke, then the air must come from a leaking seal or a similar leakage.

The encoder can be an absolute encoder or an incremental encoder. Suitable encoders include for example conductive encoders, capacitive encoders, optical encoders, and on-axis or off-axis magnetic encoders.

The disclosed method and dispenser are particularly useful for tinting pastes or paint colorants and similar paint products, but can also be used for dispensers of other types of non-Newtonian or Newtonian liquids, such as liquid food concentrates, cosmetic gels or pastes, cement slurries or paper pulp slurries.

BRIEF DESCRIPTION OF THE DRAWINGS

The invention is further explained with reference to the drawings by way of example.

DETAILED DESCRIPTION

Figure 1:
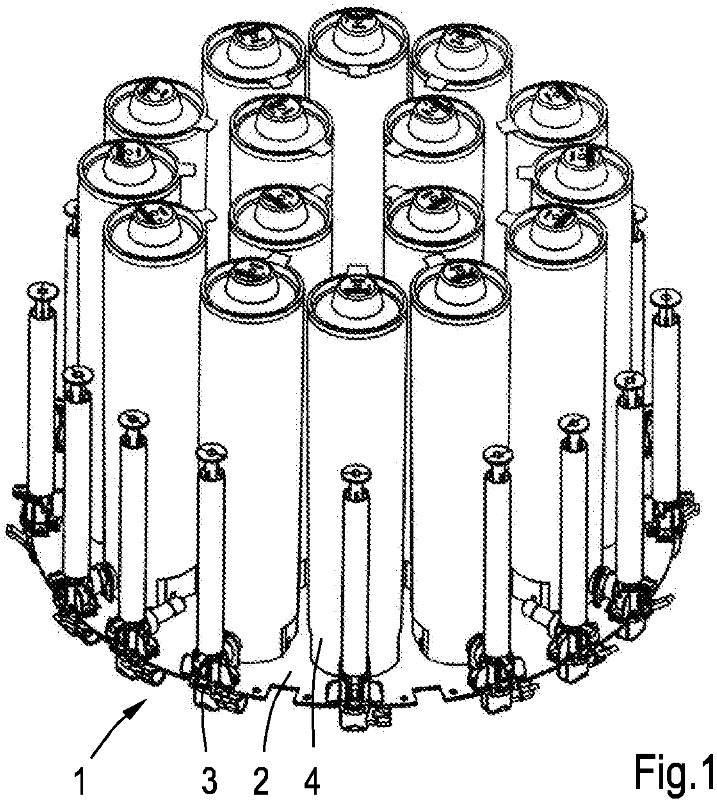
FIG. 1: shows an exemplary implementation of a colorant dispenser.

FIG. 1 illustrates the main parts of an exemplary implementation of a dispenser 1 for dispensing colorants or tinting pastes or similar paint modules for preparing a paint or lacquer of a desired formulation. The dispenser 1 includes a turntable 2, which is rotatable about a vertical axis by means of a drive (not shown) in order to rotate the turntable 2 between discrete positions. On the turntable 2, there are mounted a plurality of pumps 3, e.g., sixteen pumps. Each pump 3 is associated with a fluid container 4. Each container 4 contains a tinting paste.

Via a user interface, a user can input a paint of a desired colour or quality. A control unit determines a paint formulation producing the selected colour or quality. This includes a selection of one or more of the tinting pastes in the respective containers 4 and the required amounts. The control unit consecutively moves the selected containers to a dispensing position above a receptacle and meters the required amount of each selected tinting paste.

Figure 2:
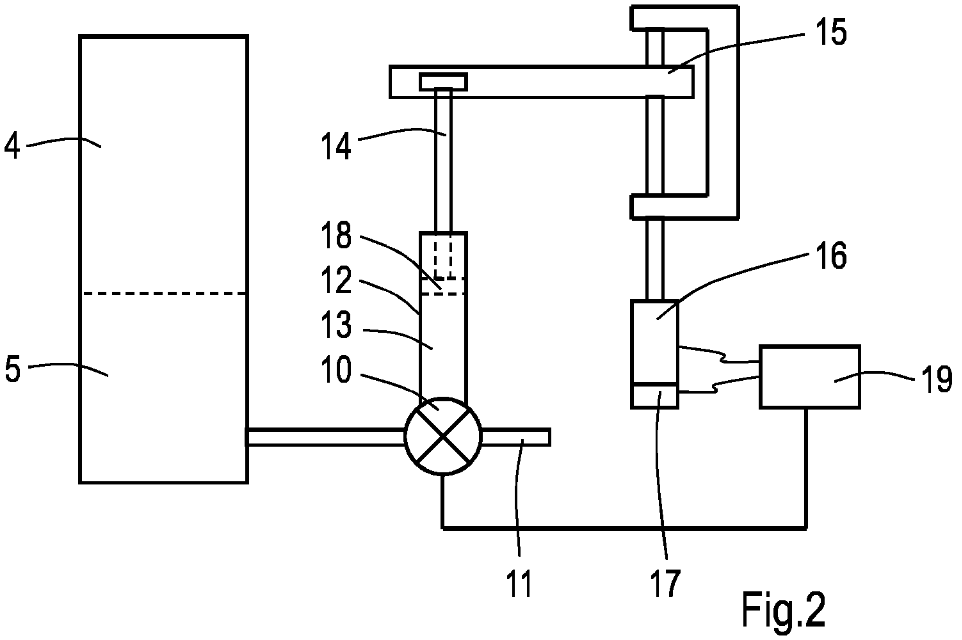
FIG. 2: schematically shows one of the containers with an associated pump of the dispenser of FIG. 1.

FIG. 2 shows a container or canister 4 in cross section. The container 4 contains a tinting paste 5 and comprises a stirrer 6 with an electric motor 9. At the lower side the container 4 is provided with an outlet 11 with a piston pump 12 for dispensing a desired amount of the tinting paste 5 and with a valve 10.

The piston pump 12 comprises a pump chamber 13 and a piston 18 with a piston rod 14 reciprocating within the pump chamber 13. The piston pump 12 is driven by a stepper motor 16. The stepper motor 16 drives the piston 18 via a spindle transmission 15, or via any other suitable transmission. An encoder 17 is linked to the stepper motor 16 to count the steps made by the stepper motor 16. A control unit 19 is linked to the encoder 17 to receive information from the encoder 17. The control unit 19 is also linked to the stepper motor 16 and with the valve 10.

To dispense the tinting paste, the control unit 19 triggers the stepper motor 16 to lift the piston 18 so as to make a suction stroke. During this suction stroke the valve 10 closes the outlet and clears a passage between the container 4 and the pump chamber 13. As a result, an amount of tinting paste flows into the pump chamber. When the pump chamber contains a desired amount of tinting paste, the valve 10 is turned to a position closing off the container and providing a passage between the pump chamber 13 and the dispense outlet 11. The control unit 19 triggers the stepper motor 16 to move the piston 18 downward, so as to make a dispense stroke to empty the pump chamber 18 and dispense the tinting paste via the outlet 11.

The control unit 19 can also move the valve 10 into a third position, closing off the pump chamber 13, as explained hereafter.

During the suction stroke the piston pump 12 is driven with a nominal speed. At the prevailing temperature and shear the viscosity of some tinting pastes may be too high. As a result the piston 18 draws a vacuum during the suction stroke in the pump chamber 13, so the pump chamber 13 is not completely filled with the desired amount of tinting paste. This will cause aberrant tinting of the final paint. The high viscosity can for instance be caused by aging, settling or evaporation of water, solvents or rheological agents.

The viscosity of the tinting paste can be tested by a test method illustrated in FIG. 3A-D. The figures show a piston pump, but the same method can be carried out with other types of reciprocating pumps, such as bellows pumps.

Figure 3A:
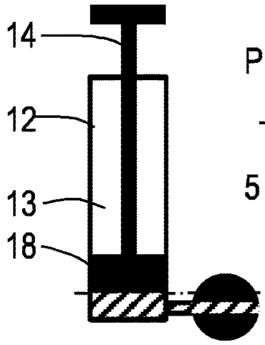
FIGS. 3A-D: show consecutive steps of a first method.
Figure 3B:
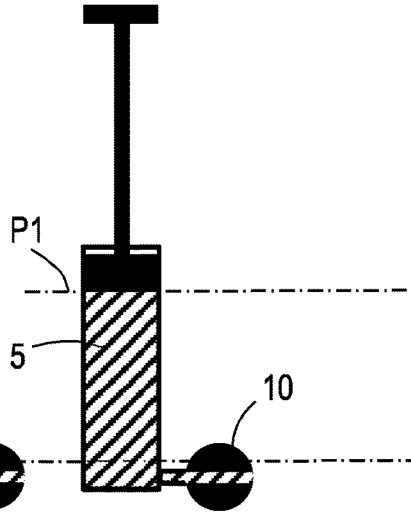
Figure 3C:
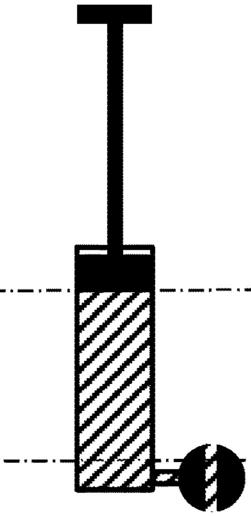
Figure 3D:
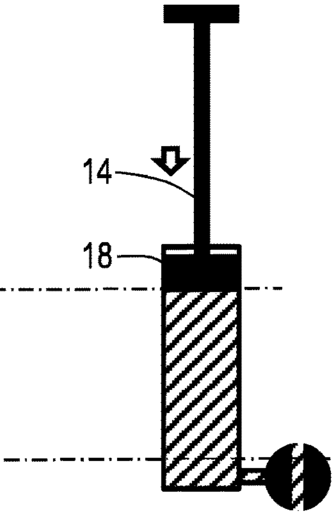

FIG. 3A shows the piston pump 12 in a position just before the start of a suction stroke. The piston 18 is at its lowest point within the pump chamber 13. The valve 10 opens the passage from the container to the pump chamber 13. The piston 18 is then moved upward to make a full suction stroke with a nominal speed to a level P1. An amount of tinting paste 5 is sucked into the pump chamber 13 (FIG. 3B). Then the valve 10 closes off the pump chamber 13 (FIG. 3C). In the shown case, the tinting paste 5 completely fills the pump chamber 13 without leaving a vacuum and without enclosing air. The tinting paste is not compressible, so any downward movement of the piston 18 is almost immediately blocked by the hydraulic counter pressure exerted by the tinting paste 5 (FIG. 3D). The stepper motor 16 stalls and the piston 18 remains essentially at the same level P1. In such a case, the viscosity of the tinting paste is sufficiently low to be pumped and metered with the used nominal pump speed and the content of the pump chamber does not contain air.

Some movement may be possible during the attempted pressure stroke as a result from the mechanical flexibility of the system. For instance the encoder 17 may count a negligible number of steps not exceeding a set limit before stalling of the stepper motor 16. The control unit 19 can be programmed to compensate for this.

Figure 4A:
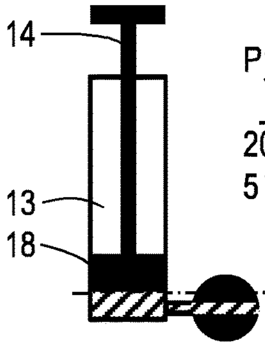
FIGS. 4A-D: show consecutive steps of a the method of FIGS. 3A-D with a paste too viscous for the pumping speed.
Figure 4B:
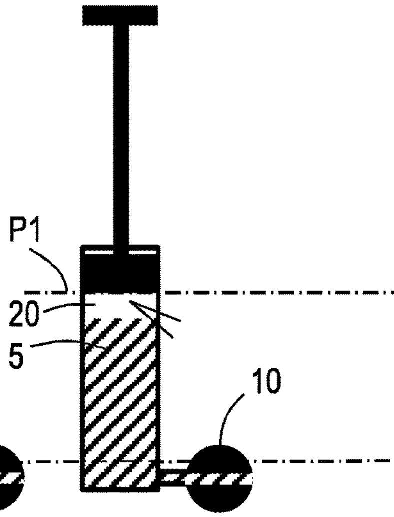
Figure 4C:
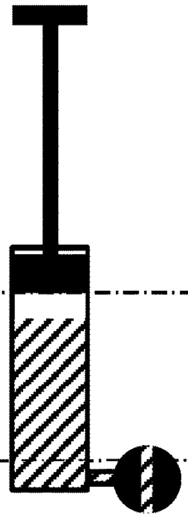
Figure 4D:
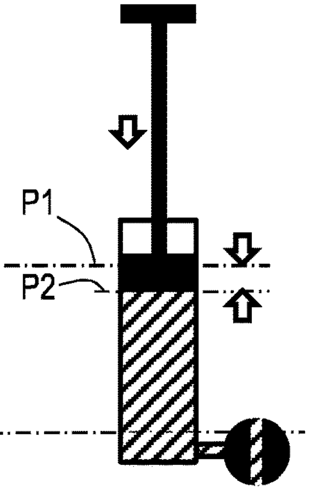

The same test run is shown in FIGS. 4A-D with a tinting paste 5 having a higher viscosity at the prevailing shear and temperature. When the piston 18 is moved up during a suction stroke with the nominal pump speed the tinting paste 5 is too viscous to follow the piston 18 and a vacuum 20 is drawn. If the tinting paste would now be dispensed, the metered amount would be substantially less than needed for the selected formulation, eventually resulting in an incorrect paint tint. The test is continued by closing off the valve (FIG. 4C) and subsequently, the piston 18 is moved down until the encoder detects that the motor stalls and the piston is blocked by the fluid surface on a level P2 (FIG. 4D) or possibly by a layer of enclosed air. The volume of the drawn vacuum 20 in FIG. 4B is directly derivable from the travel distance P1−P2 of the piston 18. This travel distance is an indication of the viscosity profile of the tinting paste and the degree of settling or aging. A new reduced pumping speed can be calculated or selected in such way that no vacuum would be drawn or a signal can be generated to alert the operator to take appropriate measures, such as refilling the container 4 with a fresh amount of the same type of pigment paste.

If the pump 12 is driven by a stepper motor 16 with an encoder 17, a more accurate indication of the volume of drawn vacuum 20 is given by the number of steps counted by the encoder 17 during the piston's return movement.

Figures 5A, 5B, 5C, 5D:
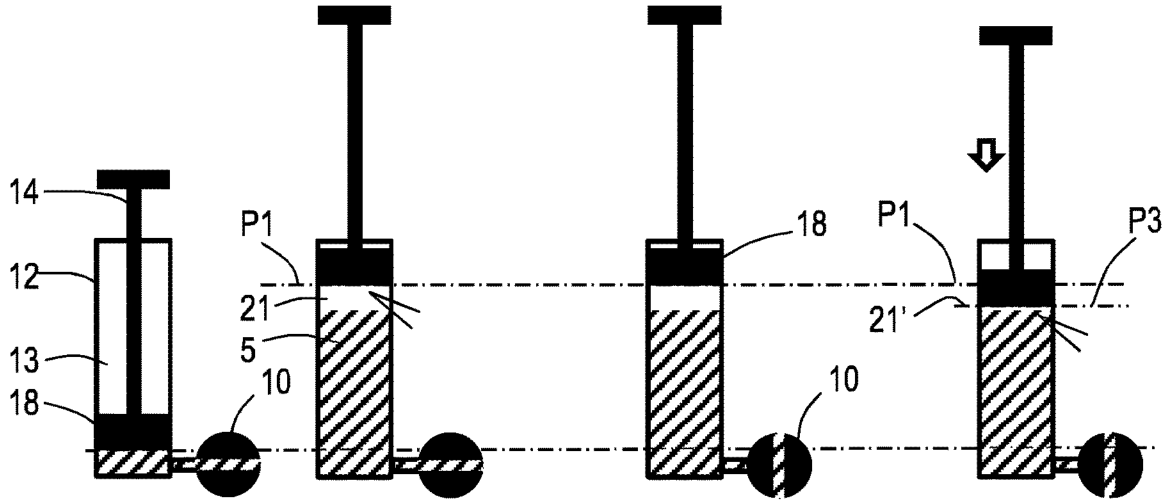
FIGS. 5A-D: show consecutive steps of a the method of FIGS. 3A-D with a paste containing air.
Figures 6A, 6B, 6C, 6D:
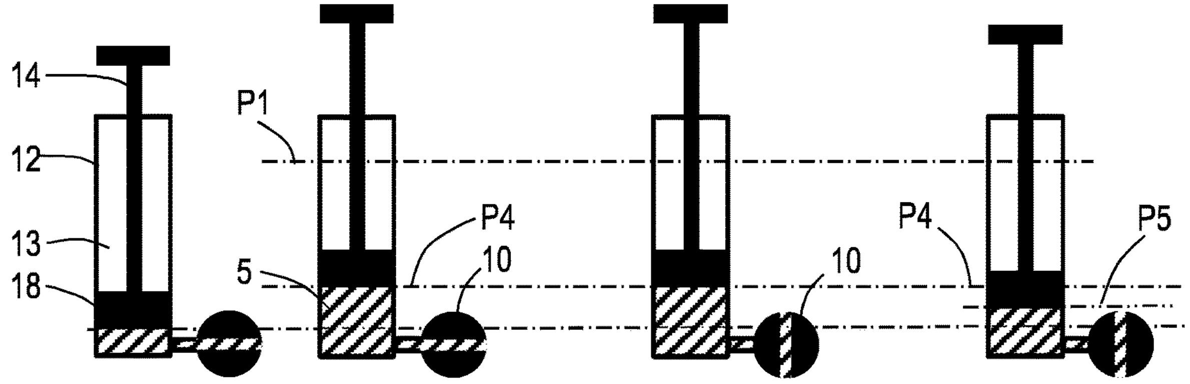
FIGS. 6A-D: show consecutive steps of a the method of FIGS. 3A-D with a paste containing air and a partial suction stroke.

FIGS. 5A-D shows a similar series of steps for checking the presence of enclosed air. In the start position of FIG. 5A, the composition below the piston is still unknown and may contain air. A tinting paste is used with a viscosity which is sufficiently low for the used pump speed, so no vacuum is drawn. The piston 18 is again moved upward to a level P1 (FIG. 5B) and the valve subsequently closes off the pump chamber 13 (FIG. 5C). A volume of air 21 is enclosed between the tinting paste and the piston 18. Subsequently, the piston 18 make a pressure stroke until the stepper motor stalls. At that moment, the piston is at a level P3 (FIG. 5D). The enclosed air 21 is compressed to a much smaller volume 21'. The observed compressibility (P1−P3)/P1 is an indication of the volume of the enclosed air. For example, if the pump is driven by a stepper motor with an encoder, the number of steps counted by the encoder 17 during the return movement from level P1 to level P3 is an accurate indication of the compressibility of the content in the pump chamber 13.

If no air or vacuum is enclosed, then P1−P3=0, so the compressibility (P1−P3)/P1 would also be 0. This situation is in fact the same as the situation in FIGS. 3A-D.

Enclosed air can be present as a layer between the fluid surface and the piston, as shown in FIGS. 5A-D, but it can also be present as encapsulated air entrapped homogenously as bubbles within the tinting paste. The first situation may be caused by a constructional leakage, while the second situation might require a recalculation of any formulation containing the examined tinting paste. Hence, if enclosed air is detected an operator might want to know how the enclosed air is distributed over the content of the pump chamber after the suction stroke.

Figures 7A, 7B, 7C, 7D:
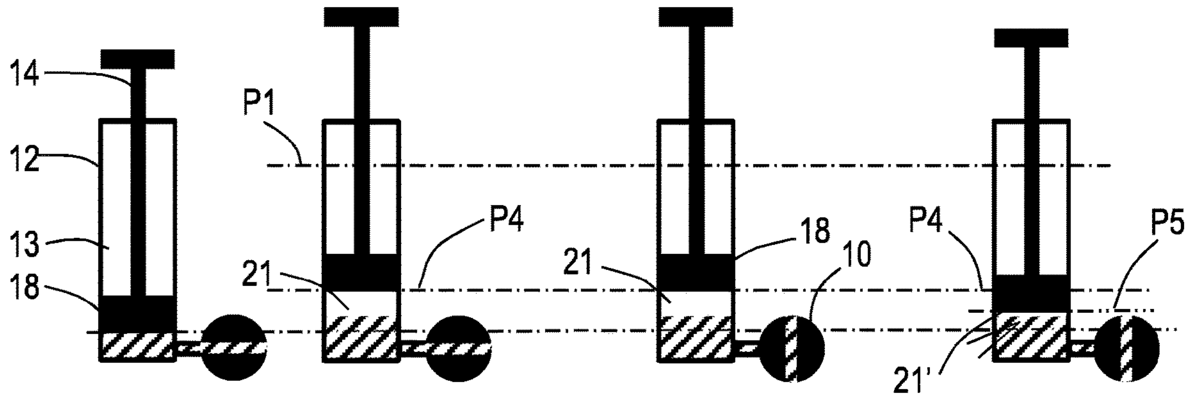
FIGS. 7A-D: show consecutive steps of a the method of FIGS. 3A-D with an air leakage and a partial suction stroke.

To check whether the enclosed air is entrapped within the tinting paste 5 or not, a further test is run with a partial suction stroke, as is shown in FIGS. 6A-D. The piston 18 is moved upward to a level P4, substantially below P1 of FIG. 5A. The valve 10 is closed (FIG. 6C) and the pump chamber content is compressed by the piston 18 traveling over a return distance to a level P5. If the compressibility (P4−P5)/P4 is about the same as the compressibility (P1−P3)/P1 in the full stroke test of FIGS. 5A-D, then the air must be entrapped homogenously within the tinting paste composition as (micro)bubbles. If, however, P4−P5≈P1−P3, then the enclosed air must come from a constructional leakage or insufficient venting of the pump, or the like. This situation is illustrated in FIGS. 7A-D. In the start position of FIG. 7A, the composition below the piston is still unknown and may contain air. In FIG. 7D a strip 21' of compressed air remains between the piston 18 and the mass of tinting paste 5.

If the air is partly within the paste and partly in a bubble, the measured results will be in between the above calculated values.

It is noted that the drawings are schematic, not necessarily to scale and that details that are not required for understanding the present invention may have been omitted. The terms "upward", "downward", "below", "above", and the like relate to the implementations as oriented in the drawings, unless otherwise specified. Further, elements that are at least substantially identical or that perform an at least substantially identical function are denoted by the same numeral, where helpful individualised with alphabetic suffixes.

The disclosure is not restricted to the above described implementations which can be varied in a number of ways within the scope of the claims.

Elements and aspects discussed for or in relation with a particular implementation may be suitably combined with elements and aspects of other implementations, unless explicitly stated otherwise.

The invention claimed is:

1. Method for operating a liquid dispenser comprising at least one liquid container and at least one reciprocating pump, the pump being configured to withdraw liquid from the container during a suction stroke, the method comprising the following steps:

a suction stroke is carried out at a set pump speed;

after the suction stroke, the pump is closed off;

a pressure stroke is started while the pump is closed, wherein if the pressure stroke is larger than a set value:

the pump is emptied;

a second suction stroke is carried out using a lower pump speed and/or including a waiting time after completion of the suction stroke;

after the second suction stroke and the optional waiting time the pump is closed off;

a pressure stroke is started while the pump is closed off.

2. Method according to claim 1, wherein the pressure stroke by the piston is continued until resistance exceeds an upper limit.

3. Method according to claim 2, wherein subsequently the steps are repeated with a partial pump stroke.

4. A liquid dispenser comprising:

a control unit for controlling the pump, wherein the control unit is programmed to run a test at a selected moment, the test involving the method steps of claim 1.

5. The dispenser of claim 4, comprising an electric motor with a rotor and at least one sensor operatively coupled with the rotor, the sensor comprising a home sensor, position sensor and/or an encoder.

6. The dispenser of claim 5, the electric motor comprising a stepper motor.

7. The dispenser of claim 6, wherein the control unit is programmed to receive the number steps counted by the encoder during a passive pressure stroke, and to generate a signal if the number exceeds a set value.

8. The dispenser of claim 6, wherein the control unit is programmed to:

receive the number of steps counted by the encoder during the suction stroke;

receive the number of steps counted by the encoder during a pressure stroke until stalling of the electric motor; and calculate the compressibility of the content in the pump chamber on basis of the difference between the two numbers.

9. The dispenser of claim 8, wherein the control unit is programmed to repeat the steps in claim 8 when applying a partial suction stroke and compare the calculated compressibility with the compressibility calculated with the complete suction stroke.

10. The dispenser of claim 8, wherein the control unit is programmed to repeat the steps in claim 8 when applying a partial suction stroke and compare the length of the pressure stroke after the first suction stroke with the length of the pressure stroke after the partial suction stroke.

11. The dispenser of claim 4, wherein the pump is a piston pump or a bellows pump.

12. Method for operating a liquid dispenser comprising at least one liquid container and at least one reciprocating pump, the pump being configured to withdraw liquid from the container during a suction stroke, the method comprising the following steps:

a suction stroke is carried out at a set pump speed;

after the suction stroke, the pump is closed off;

a pressure stroke is started while the pump is closed, wherein the pressure stroke by the piston is continued until resistance exceeds an upper limit.

13. Method according to claim 12, wherein subsequently the steps are repeated with a partial pump stroke.

14. A liquid dispenser comprising:

a control unit for controlling the pump, wherein the control unit is programmed to run a test at a selected moment, the test involving the method steps of claim 12.

15. The dispenser of claim 14, comprising an electric motor with a rotor and at least one sensor operatively coupled with the rotor, the sensor comprising a home sensor, position sensor and/or an encoder.

16. The dispenser of claim 15, the electric motor comprising a stepper motor.

17. The dispenser of claim 16, wherein the control unit is programmed to receive the number steps counted by the encoder during a passive pressure stroke, and to generate a signal if the number exceeds a set value.

18. The dispenser of claim 16, wherein the control unit is programmed to:

receive the number of steps counted by the encoder during the suction stroke;

receive the number of steps counted by the encoder during a pressure stroke until stalling of the electric motor; and calculate the compressibility of the content in the pump chamber on basis of the difference between the two numbers.

19. The dispenser of claim 18, wherein the control unit is programmed to repeat the step in claim 18 when applying a partial suction stroke and compare the calculated compressibility with the compressibility calculated with the complete suction stroke.

20. The dispenser of claim 18, wherein the control unit is programmed to repeat the steps in claim 18 when applying a partial suction stroke and compare the length of the pressure stroke after the first suction stroke with the length of the pressure stroke after the partial suction stroke.

* * * * *